(12) United States Patent
Hintz (10) Patent No.: US 8,490,366 B1
(45) Date of Patent: Jul. 23, 2013

(54) BALE WRAPPING SYSTEM

(76) Inventor: Scott Hintz, Yale, SD (US)

(*) Notice: Subject to any disclaimer, the term of this patent is extended or adjusted under 35 U.S.C. 154(b) by 718 days.

(21) Appl. No.: 12/683,820

(22) Filed: Jan. 7, 2010

Related U.S. Application Data (60) Provisional application No. 61/143,938, filed on Jan. 12, 2009.

(51) Int. Cl.
*B65B 11/04* (2006.01)
*A01F 15/07* (2006.01)
*A01F 15/08* (2006.01)

(52) U.S. Cl.
USPC ............... 53/64; 53/118; 53/587; 53/389.4; 242/422.4

(58) Field of Classification Search
USPC ...... 53/64, 118, 587, 389.2, 389.4; 242/422.4
IPC ................. A01F 15/07,15/08; B65B 11/04
See application file for complete search history.

(56) References Cited

U.S. PATENT DOCUMENTS

| | | | |
|---|---|---|---|
| 4,366,665 A | 1/1983 | VanGinhoven et al. | |
| 4,407,113 A | 10/1983 | Core | |
| 4,409,784 A | 10/1983 | VanGinhoven et al. | |
| 4,768,431 A | 9/1988 | Merritt, III et al. | |
| 4,956,968 A | 9/1990 | Underhill | |
| 5,129,207 A | 7/1992 | Butler | |
| 5,243,806 A * | 9/1993 | Jennings et al. | 53/118 |
| 5,289,672 A * | 3/1994 | Underhill | 53/587 |
| 5,433,067 A | 7/1995 | Smith | |
| 5,568,716 A * | 10/1996 | Kluver et al. | 53/587 |
| 5,687,548 A * | 11/1997 | McClure et al. | 53/64 |
| 5,855,109 A * | 1/1999 | Vande Ryse et al. | 56/341 |
| 6,536,337 B2 | 3/2003 | Huchet et al. | |
| 6,651,408 B1 * | 11/2003 | McClure | 53/587 |
| 6,981,352 B2 * | 1/2006 | Chow et al. | 53/64 |
| 7,017,717 B2 | 3/2006 | Georget | |
| 7,210,281 B2 * | 5/2007 | Viaud | 53/587 |
| 2007/0028579 A1 | 2/2007 | Posselius | |
| 2007/0157556 A1 * | 7/2007 | Feraboli et al. | 53/399 |
| 2009/0282788 A1 * | 11/2009 | Mclure | 53/587 |

FOREIGN PATENT DOCUMENTS

JP 2008005756 A * 1/2008

* cited by examiner

*Primary Examiner* — Stephen F Gerrity
(74) *Attorney, Agent, or Firm* — Neustel Law Offices (57) ABSTRACT

A bale wrapping system for wrapping a bale while maintaining independent control over both the sensor and brake assemblies. The bale wrapping system generally includes a support frame to secure a roll of wrapping material to a baler, a brake assembly secured to the support frame, wherein the brake assembly is adapted to brake a rotation of the roll of wrapping material, and a sensor assembly secured to the support frame, wherein the sensor assembly includes a sensor wheel adapted to measure an amount of outputted wrapping material. The brake assembly and the sensor assembly operate independent of each other with respect to the roll of wrapping material and the support frame. The support frame may be retrofitted to an existing baler through a coupler and a bracket extending from an elongated rod connecting opposing sides of the support frame.

19 Claims, 9 Drawing Sheets

BALE WRAPPING SYSTEM

CROSS REFERENCE TO RELATED APPLICATIONS

I hereby claim benefit under Title 35, United States Code, Section 119(e) of United States provisional patent application Ser. No. 61/143,938 filed Jan. 12, 2009. The 61/143,938 application. The 61/143,938 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to balers and more specifically it relates to a bale wrapping system for wrapping a bale while maintaining independent control over both the sensor and brake assemblies.

2. Description of the Related Art

Any discussion of the related art throughout the specification should in no way be considered as an admission that such related art is widely known or forms part of common general knowledge in the field.

In the past, types of brake mechanisms and types of sensor wheels upon balers were generally connected together. When the wrapping roll became smaller, the sensor moved along with the roll and the brake mechanism remained in place thus essentially creating a twisting motion which forced the brake mechanism and the sensor wheel to effectively work against each other and make wrapping the bales very difficult. Because of the inherent problems with the related art, there is a need for a new and improved bale wrapping system for wrapping a bale while maintaining independent control over both the sensor and brake assemblies.

BRIEF SUMMARY OF THE INVENTION

A system for wrapping a bale while maintaining independent control over both the sensor and brake assemblies. The invention generally relates to a baler which includes a support frame to secure a roll of wrapping material to a baler, a brake assembly secured to the support frame, wherein the brake assembly is adapted to brake a rotation of the roll of wrapping material, and a sensor assembly secured to the support frame, wherein the sensor assembly includes a sensor wheel adapted to measure an amount of outputted wrapping material. The brake assembly and the sensor assembly operate independent of each other with respect to the roll of wrapping material and the support frame. The support frame may be retrofitted to an existing baler through a coupler and a bracket extending from an elongated rod connecting opposing sides of the support frame.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Turning now descriptively to the drawings, in which similar reference characters denote similar elements throughout the several views, FIGS. 1 through 9 illustrate a bale wrapping system 10, which comprises a support frame 20, 30, 40 to secure a roll of wrapping material 17 to a baler 12, a brake assembly 50 secured to the support frame 20, 40, wherein the brake assembly 50 is adapted to brake a rotation of the roll of wrapping material 17, and a sensor assembly 70 secured to the support frame 30, 40, wherein the sensor assembly 70 includes a sensor wheel 73 adapted to measure an amount of outputted wrapping material. The brake assembly 50 and the sensor assembly 70 operate independent of each other with respect to the roll of wrapping material 17 and the support frame 20, 30, 40. The support frame 30 may be retrofitted to an existing baler 12 through a coupler 33 and a bracket 34 extending from an elongated rod 30 connecting opposing sides of the support frame 30. The baler 12 is comprised of a machine to wrap bales of crop materials, generally in a circular or round form. The baler 12 includes a rear opening 13 in which the bales of crop material generally exit. The baler 12 also generally includes a tongue 14 and wheels 15 to comprise a movable structure adapted for ground movement.

B. Support Frame

The support frame 20, 30, 40 is configured to secure the roll of wrapping material 17, along with the brake assembly 50 and sensor assembly 70 to the baler 12 preferably adjacent the rear opening 13 of the baler 12. The support frame includes a first side assembly 20 and a second side assembly 40 secured to opposing sides of the baler 12, generally internally, so as to secure opposing ends of the roll 17. The first side assembly 20 primarily supports the brake assembly 50 about one side of the baler 12 and the second side assembly 40 primarily supports the sensor assembly 70 about the opposing side of the baler 12.

It is appreciated that the first side assembly 20 and the second side assembly 40 may be connected, separate or of various configurations all which to efficiently support the brake assembly 50 and the sensor assembly 70 adjacent the roll 17 that is to be used to wrap the bales. The support frame also generally includes an elongated rod 30, described later in more detail, to connect the first side assembly 20 and the second side assembly 40. The support frame is generally comprised of a metal or other material capable of withstanding strong forces and heavy weights common to agricultural machinery.

The first side assembly 20 generally includes a vertical beam 21 that is secured to the baler 12. Horizontally extending from the beam 21 is a support plate 22 or other support structure. The support plate 22 connects to the rotating disc 51 of the braking assembly 50. The rotating disc 51 is rotationally coupled to the shaft 18 and roll 17 and when pressure is applied thereon, stops the roll 17 and shaft 18 from rotating.

The second side assembly 40 also generally includes a vertical beam 41 that is secured to the baler 12. Horizontally extending from the beam 41 is a support plate 42 or other support structure. The support plate 42 connects to an opposing end of the shaft 18 and roll 17 as the first side assembly 20.

An elongated rod 30 connects the first side assembly 20 to the second side assembly 40. The rod 30 may be comprised of an integral structure or may include a first section 31 and a second section 32 joined together via a coupler 33. The first section 31 extends from the beam 21 towards the second side assembly 40 and second section 32, and likewise the second section 32 extends from the second beam 41 towards the first section 31.

The first section 31 and the second section 32 are connected via the coupler 33, which may in turn be secured to the baler 12 via a bracket 34 extending from the couple. It is appreciated that when retrofitting an existing baler 12 to the present invention, a rod connecting side assemblies must generally be cut or altered. Instead of removing the rod and thus increasing an amount of time and energy required to retrofit the existing baler 12 to the present invention, the first section 31 and the second section 32 are formed via cutting the existing rod and simply joined via the coupler 33, weldebly, or other means.

The bracket 34 is generally weldebly connected to the coupler 33. The bracket 34 is preferably comprised of an angle-iron structure and includes a horizontal portion 35 extending rearwardly from the coupler 33 and a vertical portion 36 extending from the horizontal portion 35. The vertical portion 36 engages the baler 12 and assists in centering the support frame, as well as providing rigidity to the support frame and present invention by preventing the elongated rod 30 from twisting or moving due to tight engagement with the baler 12. The bracket 34 may also include an aperture 37 extending through the horizontal portion 35 to receive a fastener that is used to secure to the baler 12.

In the preferred embodiment as illustrated in FIGS. 1 through 8, the coupler 33 is utilized to ensure that the second portion 32 of the elongated rod 30 can rotate with the pivoting of the pivotal arm 71 of the sensor assembly 70 while the first portion 31 remains fixed in a rotatable position so that the connecting element 65 and sleeve 66 of the connecting element 65 remain in a fixed position. The second portion 32 is able to rotate and the first portion 31 is not able to rotate to allow the brake assembly 50 and the sensor assembly 70 to operate independently. Thus, the pivotal arm 71 is generally coupled or rotationally fixed to the second portion 32 of the elongated rod 30; however it is appreciated that the pivotal arm 71 may rotate relative the second portion 32.

Figure 1:
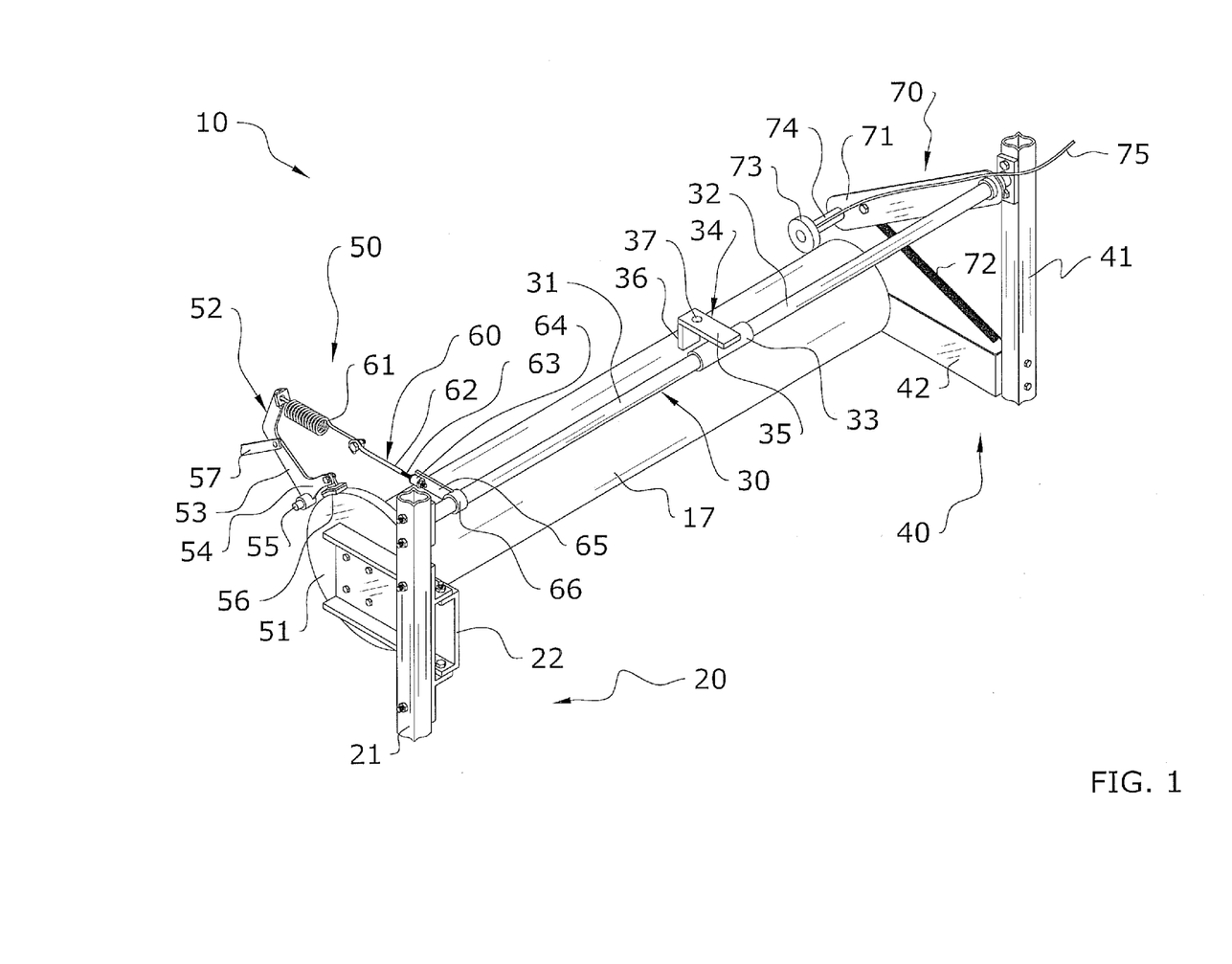
FIG. 1 is an upper perspective view of the present invention.
Figure 2:
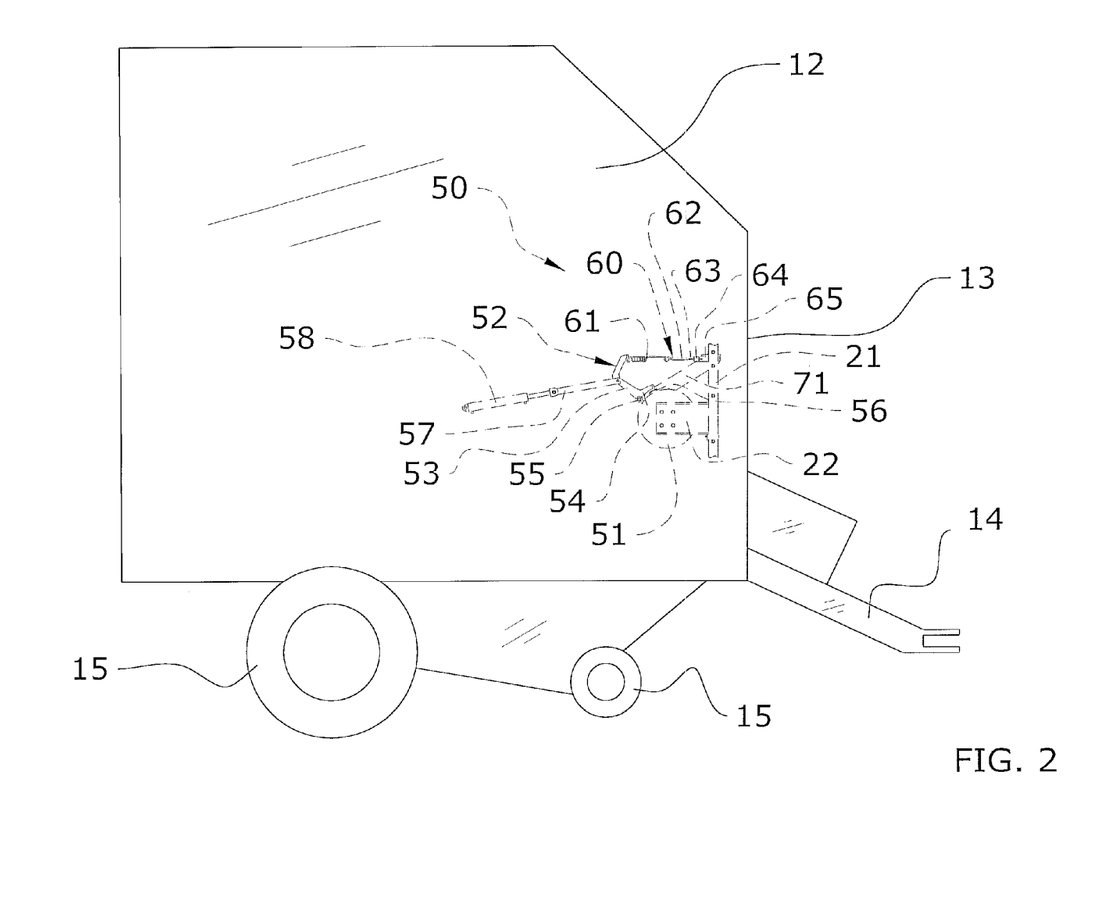
FIG. 2 is a side view of the present invention attached within a baler with the brake assembly engaged.
Figure 3:
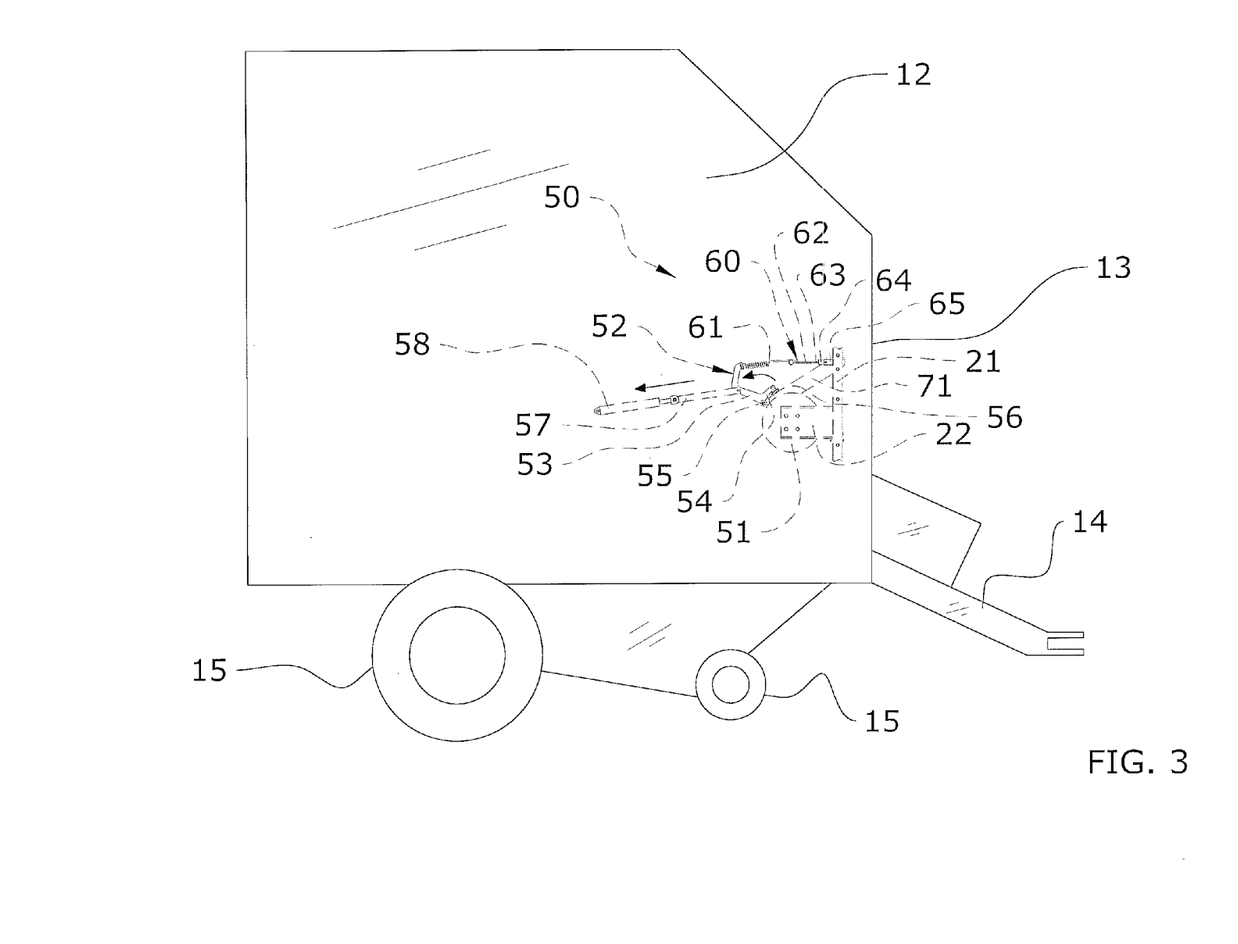
FIG. 3 is a side view of the present invention attached within a baler with the brake assembly disengaged.
Figure 4:
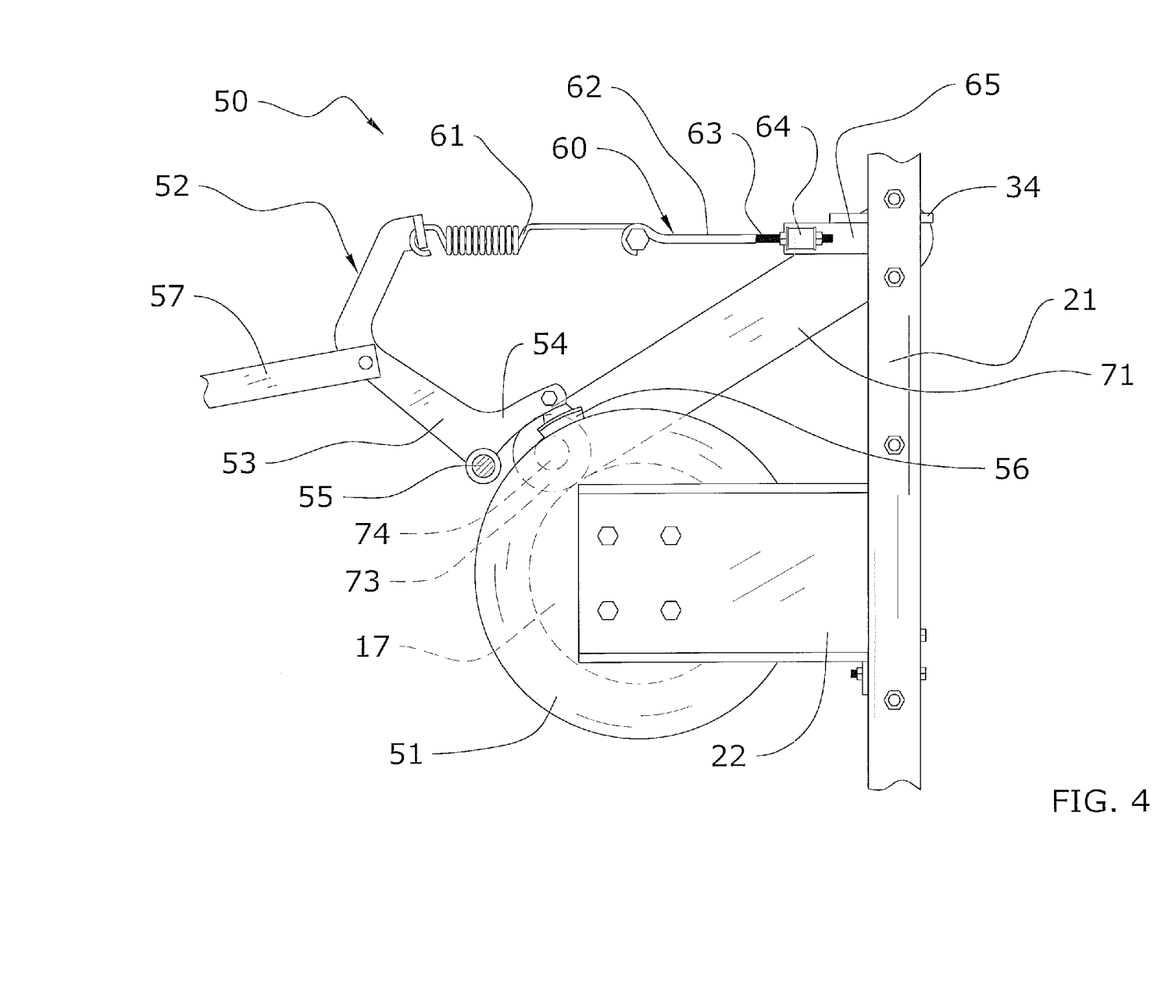
FIG. 4 is a side view of the present invention illustrating the brake mechanism.
Figure 5:
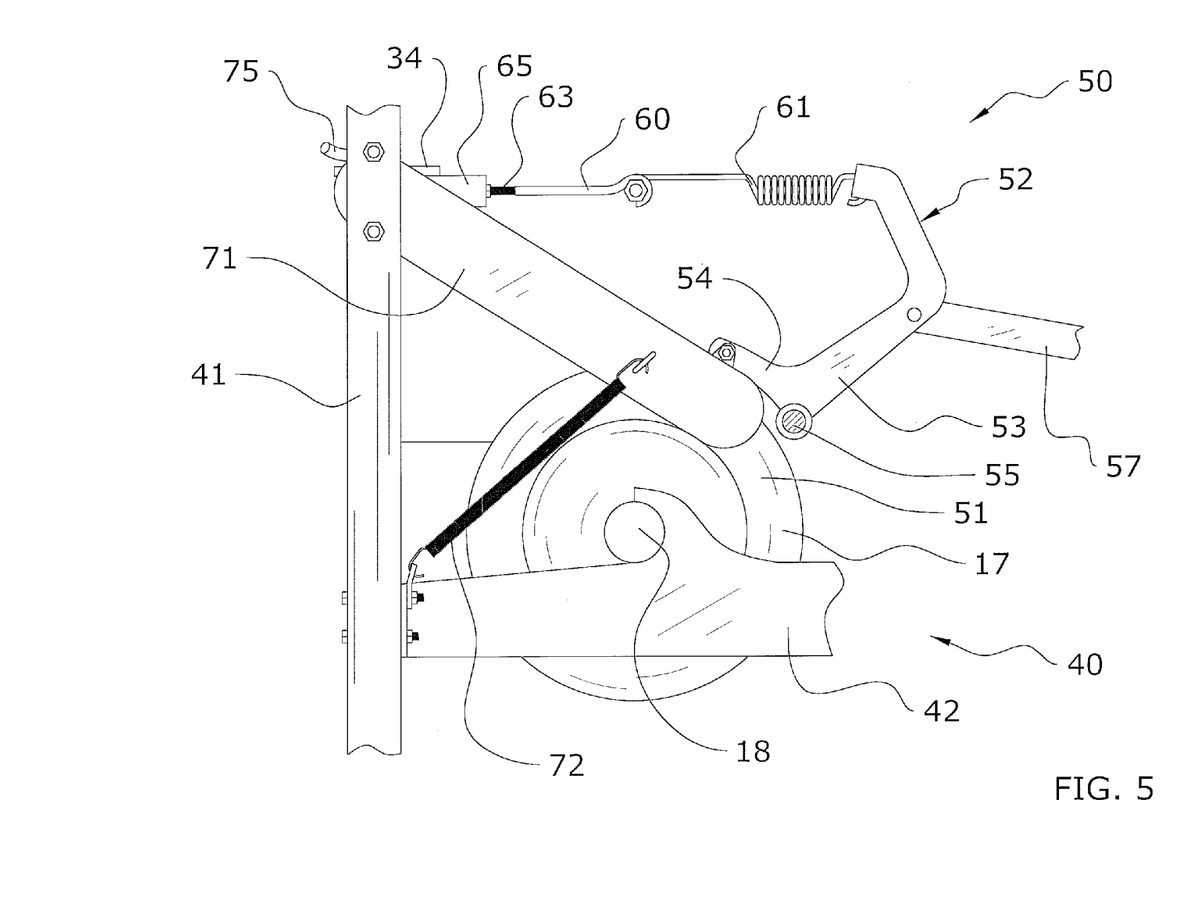
FIG. 5 is an opposite side view of the present invention illustrating the sensor wheel.
Figure 6:
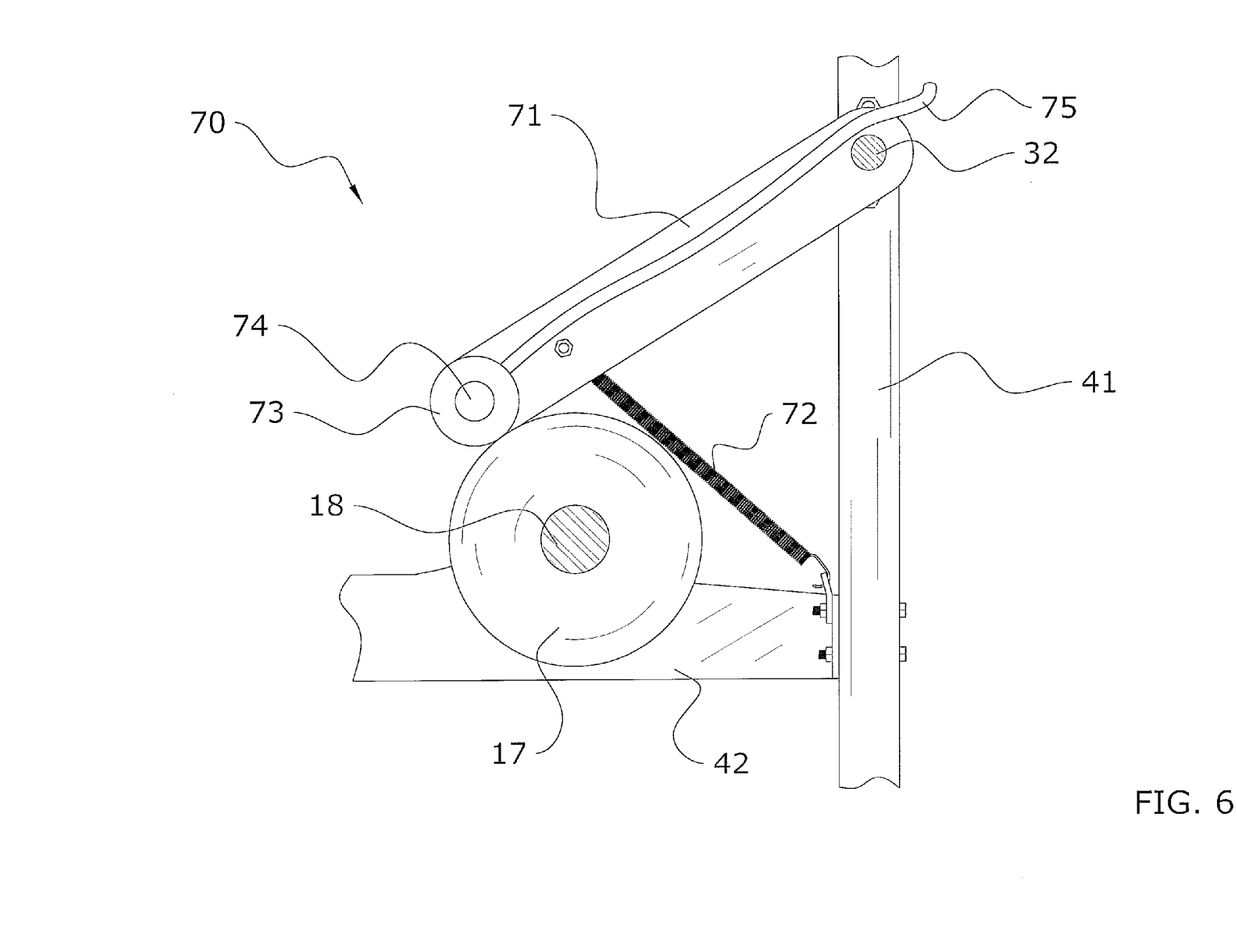
FIG. 6 is a side sectional view of the present invention illustrating the sensor wheel.
Figure 7:
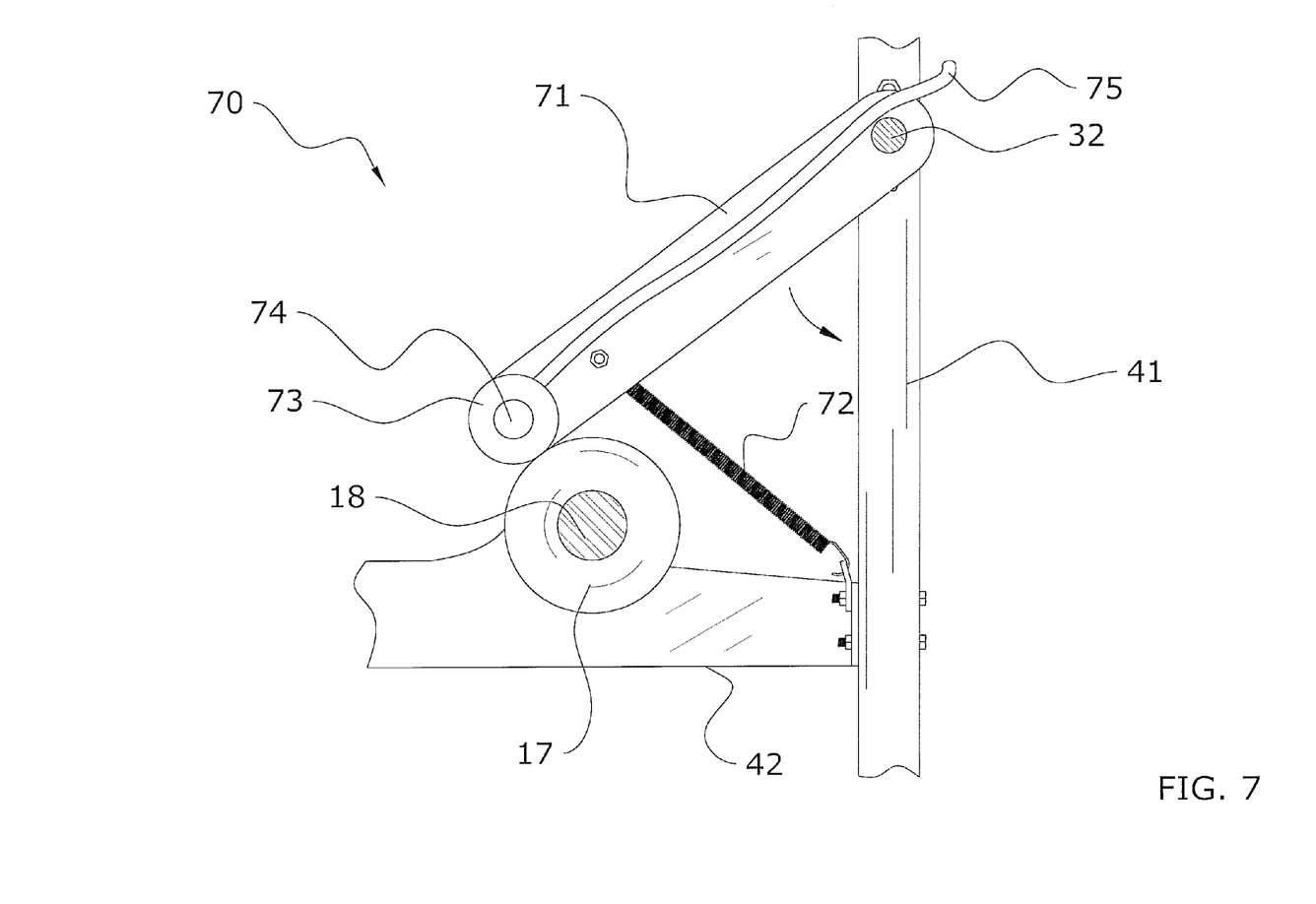
FIG. 7 is a side sectional view of the present invention illustrating the sensor wheel pivoted inwards to follow the decreasing diameter of the roll.
Figure 8:
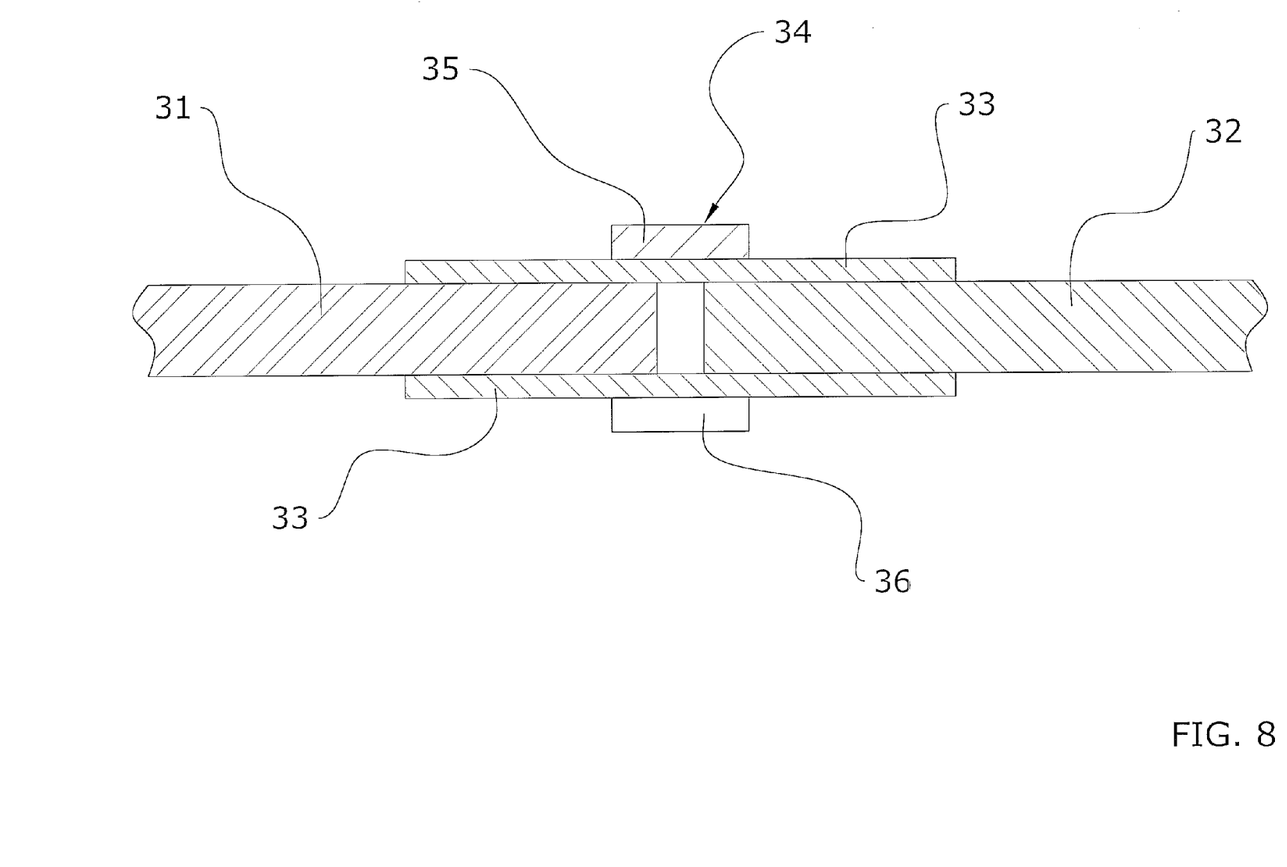
FIG. 8 is a sectional view illustrating the coupler.
Figure 9:
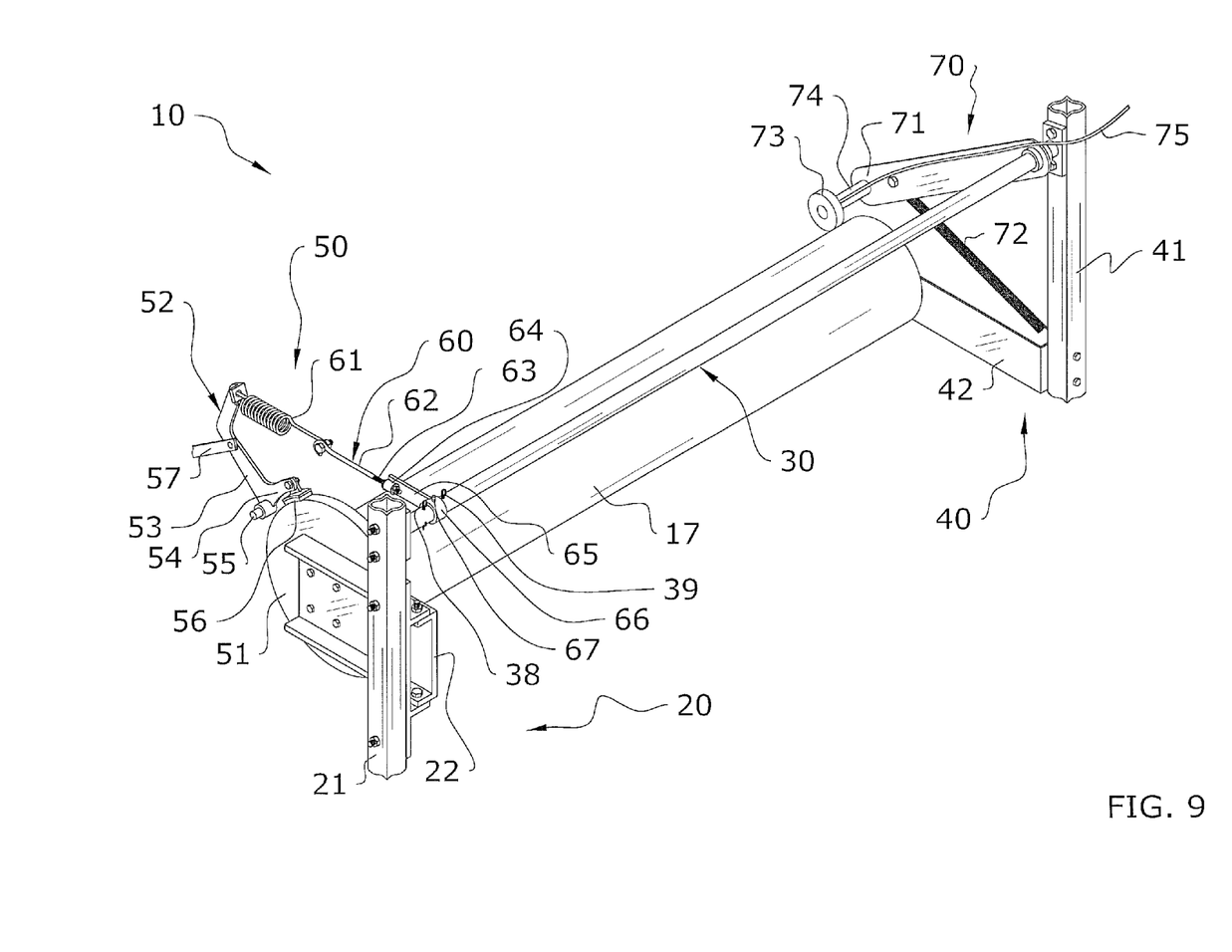
FIG. 9 is an upper perspective view of the present invention of an alternate embodiment of the present invention.

An alternative manner in which to allow the brake assembly 50 and sensor assembly 70 to operate independently via the elongated rod 30 is illustrated in FIG. 9. The alternative embodiment utilizes a single one-piece elongated rod 30 extending from the first side assembly 20 to the second side assembly 40 of the frame and connected to both the adjustment assembly 60 and the sensor assembly 70. The elongated rod 30 rotates with the pivotal arm 71 of the sensor assembly 70 while the sleeve 66 connected to the adjustment assembly 60 remains in a fixed position. The pivotal arm 71 is thus preferably rotationally coupled or fixed to the elongated rod 30.

The elongated rod 30 of FIG. 9 includes a first retainer 38 and a second retainer 39 positioned on opposing sides of the sleeve 66 of the connecting element 65 to ensure that the connecting element 65 and sleeve 66 do not move from side-to-side along the elongated rod 30 while the elongated rod 30 rotates. The first retainer 38 and the second retainer 39 are preferably comprised of retainer clips extending through apertures in the elongated rod 30 on both sides of the sleeve 66.

The sleeve 66 also preferably includes a grease fitting 67 extending therefrom and leading to the space between the sleeve 66 and the elongated rod 30. The grease fitting 67 allows for the insertion of grease or other lubrication between the sleeve 66 and the elongated rod 30 so that the elongated rod 30 is allowed to rotate within the stationary sleeve 66 and the elongated rod 30 can rotate with the pivoting of the pivotal arm 71 while the sleeve 66 connecting the elongated rod 30 to the adjustment assembly 60 and brake assembly 50 remains stationary and non-rotatable relative the elongated rod 30. Thus, the brake assembly 50 and the sensor assembly 70 remain independently operable even though the one-piece rotational elongated rod 30 is supporting both the sleeve 66 of the adjustment assembly 60 of the brake assembly 50 and the pivotal arm 71 of the sensor assembly 70.

C. Brake Assembly

The brake assembly 50 is connected to the first side assembly 20 so as to independently operate with respect to the sensor assembly 70 and sensor wheel 73. The brake assembly 50 includes a pivotal lever 52 that is pivotally connected at a pivot point 55 via a member. The lever 52 includes a first portion 53 generally deemed an upper portion to be pulled or pushed according to whether braking is desired and a second portion 54 generally deemed a lower portion to pivot and apply pressure upon the braking disc 51 when desired. The first portion 53 and the second portion 54 form a substantial L-shaped configuration as shown in the Figures, wherein the lower corner of the L-shape is generally where the pivot 55 is located.

A brake pad 56 extends from the second portion 54 of the lever 52 so as to contact the disc 51 when the brake assembly 50 is engaged. The brake pad 56 may be comprised of several materials or technologies all which supply a breaking force upon the breaking disc 51. The brake pad 56 may also be pivotally connected to the lever 52 to flushly engage the circular disc 51.

A linking element 57 extends from the first portion 53 of the lever 52 between the pivot of the lever 52 and the upper end of the lever 52. The linking element 57 links the lever 52 to an actuator 58, that when activated, pulls the brake pad 56 away from the braking disc 51 to allow the braking disc 51 and the roll 17 to rotate and thus allow wrapping of the bale. The actuator 58 is generally comprised of an extendable and retractable cylinder, such as a hydraulic or electric cylinder. When the actuator 58 is deactivated or extended, the lever 52 in turn pivots downward so that the brake pad 56 engages the braking disc 51 which forces the braking disc 51 and roll 17 to stop rotating.

The brake assembly 50 also includes an adjustment assembly 60 connecting the upper end of the first portion 53 of the lever 52 to the elongated rod 30 adjacent the first side assembly 20. The adjustment assembly 60 assists in the force of the actuator 58 to ensure that the brake pad 56 frictionally engages the rotating disc 51. The adjustment assembly 60 generally includes a spring 61, such as a torsion spring 61, and an adjustment member 62 extending therefrom.

The adjustment member 62 is connected to the spring 61 generally through a fastener or eyebolt structure. The adjustment member 62 generally includes a threaded end 63 in which an eyebolt bushing 64 may be adjusted linearly upon. The bushing 64 is connected to a connecting element 65 which is secured upon the elongated rod 30 or first side assembly 20 via the sleeve 66. The first portion 31 of the elongated rod 30 generally remains in a stationary non-rotatable position to prevent the adjustment assembly 60 from rotating.

By linearly adjusting the bushing 64 toward or away from the spring 61 along the threads of the adjustment member 62, the pivotal position of the lever 52 adjusts, thus adjusting an amount of force that the brake pad 56 is applying to the rotating disc 51 in the engaged position. The spring 61 allows the adjustment assembly 60 to stretch or extend, such as when the pivotal lever 52 is being disengaged by the actuator 58.

D. Sensor Assembly

Upon the opposite side of the roll 17 as the brake assembly 50 is the sensor assembly 70 which operates independently of the brake assembly 50. The sensor assembly 70 is used to measure an outputted amount of material from the roll 17 to determine how much material is being used to wrap the bales and how much material remains on the roll 17.

The sensor assembly 70 is operatively connected to the second side assembly 40. The sensor assembly 70 generally includes a pivotal arm 71 extending from the second section 32 or second side assembly 40 towards and over a portion of the roll 17. The pivotal arm 71 freely pivots about the second section 32 and preferably does so along with a thickness of the roll 17. The pivotal arm 71 may also be rotationally coupled to the second portion 32 of the elongated rod 30, wherein the second portion 32 of the elongated rod 30 freely rotates relative the stationary first portion 31 of the elongated rod 30.

The pivotal arm 71 is connected to the second side assembly 40 or second section 32 of the rod 30 at a proximal end and extends over the roll 17 at a distal end. A spring 72 is connected adjacent the distal end of the pivotal arm 71 and extends to the second side assembly 40 to apply an inward force upon the pivotal arm 71 towards the roll 17 so that the sensor wheel 73 maintains a constant pressure upon the outside of the roll 17 as the roll 17 becomes smaller. The spring 72 may be secured to the pivotal arm 71 and second side assembly 40 in various manners, such as through bolts, eyebolts, or the like. The spring 72 is of an adequate length so as to be able to stretch to a maximum thickness of the roll 17 yet still apply a constant force upon the pivotal arm 71 when the roll 17 is nearly gone or unraveled.

A shaft 74 extends from the distal end of the pivotal arm 71 opposite the second section 32 to rotationally support the sensor wheel 73. The sensor wheel 73 rotates along the outside of the roll 17 as the roll 17 is rotating to measure the outputted length of the roll 17 so as to determine at which point the roll 17 should be cut for each bale. This thus maintains a consistent amount of roll 17 length for each bale. A wire 75 or wireless connection may connect the sensor wheel 73 to various controls, etc. for reading the measurements or readings taken by the sensor wheel 73.

E. Operation of Preferred Embodiment

In use, as the bale is being wrapped with the roll 17 material, the sensor wheel 73 spins along the outside of the roll 17 to measure an amount of outputted roll 17. At the desired length of outputted roll 17 for each bale, the brake assembly 50 is activated and thus engages the braking disc 51 to stop the rotation of the roll 17 so that the roll 17 may be cut and the bale released from the bale. The sensor wheel 73 and the brake assembly 50 operate independently of each other via the spring 72 applying a force solely to the sensor wheel 73 part of the present invention and another spring 61 applying force to the braking assembly 50 of the present invention. It is appreciated that the roll 17 is cut via a cutting mechanism (not shown) that preferably operates separately of the present invention, such as a knife, etc.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A bale wrapping system for a crop baler, comprising:
   a roll of wrapping material adapted to wrap crop material into a bale form;
   a support frame to secure said roll of wrapping material to a baler;
   wherein said support frame includes a first side assembly adapted to secure a first end of said roll of wrapping material;
   wherein said support frame includes a second side assembly adapted to secure a second end of said roll of wrapping material;
   wherein said support frame includes an elongated rod connecting said first side assembly to said second side assembly;
   a brake assembly secured to said support frame, wherein said brake assembly is adapted to brake a rotation of said roll of wrapping material; and
   a sensor assembly secured to said support frame and said elongated rod, wherein said sensor assembly includes a sensor wheel adapted to measure an amount of outputted wrapping material;
   wherein said brake assembly and said sensor assembly operate independent of each other with respect to said roll of wrapping material and said support frame.

2. The bale wrapping system of claim 1, wherein said brake assembly includes a rotating disc rotationally coupled to said roll of wrapping material and wherein said brake assembly includes a brake pad to apply a frictionally stopping force to said rotating disc.

3. The bale wrapping system of claim 2, wherein said brake assembly includes an operative pivotal lever to support said brake pad.

4. The bale wrapping system of claim 3, wherein said brake assembly includes an actuator to pivot said pivotal lever.

5. The bale wrapping system of claim 4, wherein said actuator is comprised of a retractable cylinder.

6. The bale wrapping system of claim 3, wherein said brake assembly includes an adjustment assembly interconnecting said pivotal lever with said support frame, wherein said adjustment assembly adjusts a tension of said brake pad upon said rotating disc.

7. The bale wrapping system of claim 6, wherein said adjustment assembly includes a torsion spring.

8. The bale wrapping system of claim 1, wherein said sensor assembly includes a pivotal arm to secure said sensor wheel to said support frame.

9. The bale wrapping system of claim 8, wherein said sensor assembly includes a spring interconnecting said pivotal arm with said support frame for applying a tensioning force upon said sensor wheel relative said roll of wrapping material.

10. A bale wrapping system, comprising:
a baler adapted to wrap crop materials into a bale form, wherein said baler includes a wheeled structure adapted for ground movement;
a roll of wrapping material disposed across a rear opening of said baler, wherein said roll of wrapping material is adapted to wrap said crop material;
a support frame to secure said roll of wrapping material to said baler;
wherein said support frame includes a first side assembly adapted to secure a first end of said roll of wrapping material;
wherein said support frame includes a second side assembly adapted to secure a second end of said roll of wrapping material;
wherein said support frame includes an elongated rod connecting said first side assembly to said second side assembly;
a brake assembly secured to said first side assembly, wherein said brake assembly is adapted to brake a rotation of said roll of wrapping material;
an adjustment assembly connecting said brake assembly with said elongated rod and adapted to adjust a tension of said brake assembly; and
a sensor assembly secured to said second side assembly and said elongated rod, wherein said sensor assembly includes a sensor wheel adapted to measure an amount of outputted wrapping material;
wherein said elongated rod rotates with a pivotal movement of said sensor assembly and wherein said adjustment assembly does not rotate with said elongated rod;
wherein said brake assembly and said sensor assembly operate independent of each other with respect to said roll of wrapping material and said support frame.

11. The bale wrapping system of claim 10, wherein said brake assembly includes a rotating disc rotationally coupled to said roll of wrapping material and wherein said brake assembly includes a brake pad to apply a frictionally stopping force to said rotating disc.

12. The bale wrapping system of claim 11, wherein said brake assembly includes an operative pivotal lever to support said brake pad.

13. The bale wrapping system of claim 12, wherein said brake assembly includes an actuator to pivot said pivotal lever.

14. The bale wrapping system of claim 13, wherein said actuator is comprised of a retractable cylinder.

15. The bale wrapping system of claim 10, wherein said adjustment assembly includes a torsion spring.

16. The bale wrapping system of claim 10, wherein said sensor assembly includes a pivotal arm interconnecting said sensor wheel to said elongated rod.

17. The bale wrapping system of claim 16, wherein said sensor assembly includes a spring interconnecting said pivotal arm with said second side assembly for applying a tensioning force upon said sensor wheel relative said roll of wrapping material.

18. The bale wrapping system of claim 10, wherein said elongated rod includes a first retainer and a second retainer positioned on opposing sides of said adjustment assembly and adapted to prevent a side-to-side movement of said adjustment assembly while said elongated rod is rotating.

19. A bale wrapping system, comprising:
a baler adapted to wrap crop materials into a bale form, wherein said baler includes a wheeled structure adapted for ground movement;
a roll of wrapping material disposed across a rear opening of said baler, wherein said roll of wrapping material is adapted to wrap said crop material;
a support frame to secure said roll of wrapping material to said baler;
wherein said support frame includes a first side assembly adapted to secure a first end of said roll of wrapping material and wherein said support frame includes a second side assembly adapted to secure a second end of said roll of wrapping material;
wherein said support frame includes an elongated rod having a first section and a second section for connecting said first side assembly to said second side assembly;
wherein said elongated rod includes a coupler for joining said first section to said second section;
wherein said second section freely rotates relative said first section;
wherein said support frame includes an angled bracket connected to said coupler for securing to said baler;
a brake assembly secured to said first side assembly, wherein said brake assembly is adapted to brake a rotation of said roll of wrapping material;
wherein said brake assembly includes a rotating disc rotationally coupled to said roll of wrapping material and wherein said brake assembly includes a brake pad to apply a frictionally stopping force to said rotating disc;
wherein said brake assembly includes an operative pivotal lever to support said brake pad;
wherein said lever is comprised of an L-shape;
wherein said brake assembly includes an actuator to pivot said pivotal lever;
wherein said actuator is comprised of a retractable cylinder;
wherein said brake assembly includes an adjustment assembly interconnecting said pivotal lever with said support frame, wherein said adjustment assembly adjusts a tension of said brake pad upon said rotating disc;
wherein said adjustment assembly includes a torsion spring; and
a sensor assembly secured to said second side assembly, wherein said sensor assembly includes a sensor wheel adapted to measure an amount of outputted wrapping material;
wherein said sensor assembly includes a pivotal arm to secure said sensor wheel to said support frame;

wherein said sensor assembly includes a spring interconnecting said pivotal arm with said support frame for applying a tensioning force upon said sensor wheel relative said roll of wrapping material;

wherein said brake assembly and said sensor assembly operate independent of each other with respect to said roll of wrapping material and said support frame.

\* \* \* \* \*